(12) United States Patent
Ward et al.

(10) Patent No.: US 8,813,932 B2
(45) Date of Patent: Aug. 26, 2014

(54) ISOLATOR DECOUPLER

(75) Inventors: Peter Ward, Farmington Hills, MI (US); Alexander Serkh, Troy, MI (US); Imtiaz Ali, Lathrup Village, MI (US); Dean Schneider, Washington, MI (US)

(73) Assignee: The Gates Corporation, Denver, CO (US)

( * ) Notice: Subject to any disclaimer, the term of this patent is extended or adjusted under 35 U.S.C. 154(b) by 154 days.

(21) Appl. No.: 13/414,838

(22) Filed: Mar. 8, 2012

(65) Prior Publication Data

US 2013/0233670 A1 Sep. 12, 2013

(51) Int. Cl.
*F16D 41/20* (2006.01)
*F16H 55/36* (2006.01)

(52) U.S. Cl.
USPC ............................ 192/55.5; 464/57; 192/41 S

(58) Field of Classification Search
USPC ................................. 192/55.5, 55.2
See application file for complete search history.

(56) References Cited

U.S. PATENT DOCUMENTS

| | | |
|---|---|---|
| 3,618,730 A | 11/1971 | Mould |
| 5,139,463 A | 8/1992 | Bytzek et al. |
| 5,156,573 A | 10/1992 | Bytzek et al. |
| 6,044,943 A | 4/2000 | Bytzek et al. |
| 6,083,130 A | 7/2000 | Mevissen et al. |
| 7,153,227 B2 | 12/2006 | Dell et al. |
| 7,207,910 B2 | 4/2007 | Dell et al. |
| 7,618,337 B2 * | 11/2009 | Jansen et al. ................... 474/74 |
| 7,712,592 B2 | 5/2010 | Jansen et al. |
| 7,766,774 B2 | 8/2010 | Antchak et al. |
| 7,975,821 B2 | 7/2011 | Antchak et al. |
| 8,006,819 B2 | 8/2011 | Dell et al. |
| 8,047,920 B2 | 11/2011 | Jansen et al. |
| 8,192,312 B2 * | 6/2012 | Ali et al. ......................... 474/94 |
| 2010/0101909 A1* | 4/2010 | Dell et al. ....................... 192/43 |
| 2011/0065537 A1 | 3/2011 | Serkh et al. |
| 2011/0224038 A1 | 9/2011 | Aantchak et al. |
| 2012/0298474 A1* | 11/2012 | Ward et al. ................... 192/41 S |

OTHER PUBLICATIONS

European Patent Office, Notification of Transmittal of the International Search Report and the Written Opinion of the International Searching Authority, or the Declaration; Mailing Date Aug. 8, 2013.

* cited by examiner

*Primary Examiner* — Gene Crawford
*Assistant Examiner* — Mark Manley
(74) *Attorney, Agent, or Firm* — Jeffrey A. Thurnau, Esq.; Paul N. Dunlap, Esq.

(57) ABSTRACT

An isolator decoupler comprising a pulley, the pulley journalled to a shaft, a torsion spring having an end engaged with the pulley, the torsion spring loadable in an unwinding direction, a one-way clutch carrier, a one-way clutch disposed between the shaft and the one-way clutch carrier, a wrap spring engagable with an inner surface of the one-way clutch carrier, the wrap spring coupled to the torsion spring, and the wrap spring loadable in the unwinding direction such that the wrap spring through friction is able to lockably engage the inner surface in a driving direction.

11 Claims, 7 Drawing Sheets

ISOLATOR DECOUPLER

FIELD OF THE INVENTION

The invention relates to an isolator decoupler having a wrap spring engagable with an inner surface of the one-way clutch carrier, the wrap spring coupled to the torsion spring, and the wrap spring loadable in the unwinding direction such that the wrap spring through friction is able to lockably engage the inner surface in a driving direction.

BACKGROUND OF THE INVENTION

Diesel engines used for passenger car applications is increasing due to the benefit of better fuel economy. Further, gasoline engines are increasing compression ratios to improve the fuel efficiency. As a result, diesel and gasoline engine accessory drive systems have to overcome the vibrations of greater magnitude from crankshafts due to above mentioned changes in engines.

Due to increased crankshaft vibration plus high acceleration/deceleration rates and high alternator inertia the engine accessory drive system is often experiencing belt chirp noise due to belt slip. This will also reduce the belt operating life.

Crankshaft isolators/decouplers and alternator decouplers/isolators have been widely used for engines with high angular vibration to filter out vibration in engine operation speed range. However, although a crankshaft isolator can function very well in engine running speed range; it still presents problems during engine start-up or shut-down due to the natural frequency of the isolator itself.

Representative of the art is U.S. Pat. No. 8,047,920 which discloses a decoupler having an output member, a one-way clutch, a spring and a spring limiter. The spring is disposed between an output portion of the one-way clutch and the output member to bias the output portion in a predetermined rotational direction relative to the output member. The spring limiter can be configured to lock an output of the one-way clutch to the output member to transmit rotary power between the one-way clutch and the output member without stressing the spring beyond a predetermined point and/or to limit rotational movement of the output portion and an associated end of the spring relative to the output member in the predetermined rotational direction. A method for operating a decoupler is also provided.

What is needed is an isolator decoupler having a wrap spring engagable with an inner surface of the one-way clutch carrier, the wrap spring coupled to the torsion spring, and the wrap spring loadable in the unwinding direction such that the wrap spring through friction is able to lockably engage the inner surface in a driving direction. The present invention meets this need.

SUMMARY OF THE INVENTION

The primary aspect of the invention is an isolator decoupler having a wrap spring engagable with an inner surface of the one-way clutch carrier, the wrap spring coupled to the torsion spring, and the wrap spring loadable in the unwinding direction such that the wrap spring through friction is able to lockably engage the inner surface in a driving direction.

Other aspects of the invention will be pointed out or made obvious by the following description of the invention and the accompanying drawings.

The invention comprises an isolator decoupler comprising a pulley, the pulley journalled to a shaft, a torsion spring having an end engaged with the pulley, the torsion spring loadable in an unwinding direction, a one-way clutch carrier, a one-way clutch disposed between the shaft and the one-way clutch carrier, a wrap spring engagable with an inner surface of the one-way clutch carrier, the wrap spring coupled to the torsion spring, and the wrap spring loadable in the unwinding direction such that the wrap spring through friction is able to lockably engage the inner surface in a driving direction.

BRIEF DESCRIPTION OF THE DRAWINGS

The accompanying drawings, which are incorporated in and form a part of the specification, illustrate preferred embodiments of the present invention, and together with a description, serve to explain the principles of the invention.

DETAILED DESCRIPTION OF THE PREFERRED EMBODIMENT

This invention relates to alternator tuning devices, particularly to alternator isolating pulleys with torsional springs for isolation and/or one-way clutches for decoupling. To minimize the physical size of the spring and one-way clutch it is beneificial to have an overload feature that prevents torque in excess of a predetemined amount to be transmitted to the spring and/or one-way clutch. Excessive torque applied to either the spring or one-way clutch could cause either componet to fail. What is needed is a slip feature that permits decoupling of two locked elements when a specific torque is exceeeded.

It is known that the rated peak torque of an alternator is less than the peak torque observed when starting the engine. For example, a typical automotive alternator will have a rated peak torque of 12 Nm, an inertia of 0.0030 kg m², and an acceleration rate at the alternator of 8,400 rad/s² during engine starting. Using Equation 1 at engine start-up the device must be able to handle 25.2 Nm of torque, but will never see such a high torque during all other operating conditions.

$$T = I\alpha \qquad \text{Equation 1}$$

T=torque
I=alternator inertia
α=acceleration rate

To prevent needing to use a spring and one-way clutch that can handle the starting torque the proposed device uses a wrap spring that is decoupled after the peak rated torque.

Figure 1:
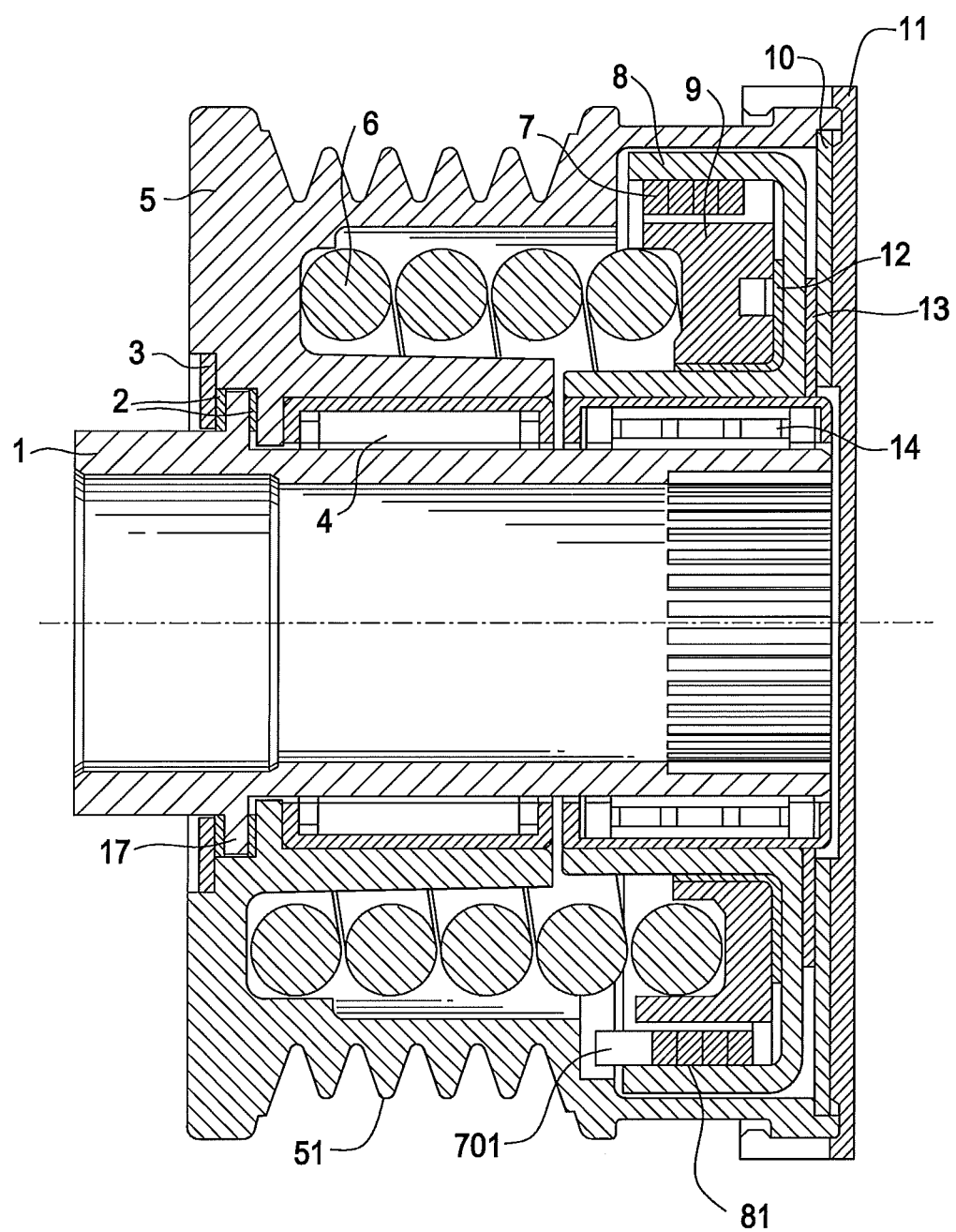
FIG. 1 is a cross section of the inventive device.

FIG. 1 is a cross section of the inventive device. Pulley 5 engages with a drive belt to drive the device. The belt (not shown) may comprise any profile known in the art, including multi-rib, toothed or flat. The profile 51 shown for the pulley in FIG. 1 is for a multi-ribbed belt.

Pulley 5 is jounalled to shaft 1 by a needle bearing 4. Needle bearing 4 allows relative rotational motion between shaft 1 and pulley 5 while also transfering the radial load to shaft 1. The radial load is a function of the preload or tension on the drive belt. Shaft 1 is also used to connect the device to a driven accessory such as an alternator.

Power flows from the belt to pulley 5, and then to one end 61 of torsion spring 6. Torsion spring 6 is an elastic member that attenuates vibration and provides the torsional vibration isolating function of the device. The other end 62 of torsion spring 6 is connected to spring carrier 9. Spring carrier 9 is coupled to wrap spring 7. Wrap spring 7 is engaged with the spring carrier 9 at a wrap spring end 71. Spring carrier 9 receives end 71 in a receiving portion 91. Wrap spring 7 has a square or rectangular cross section in order to optimize the surface available to contact the inner surface 81 of clutch carrier 8. Wrap spring 7 is contained within a width (W) of the one-way clutch carrier.

In order to transmit power, wrap spring 7 is loaded in the unwinding direction which casues it to radially expand during operation. This casues the wrap spring to frictionally engage an inner surface 81 of the clutch carrier 8. The fricitonal engagement locks the wrap spring and the clutch carrier together to efficiently transmit power.

Thrust washers 2 engage both sides of projection 17. Projection 17 extends radially from shaft 1. Thrust washers 2 locate pulley 5 axailly along shaft 1.

Figure 2:
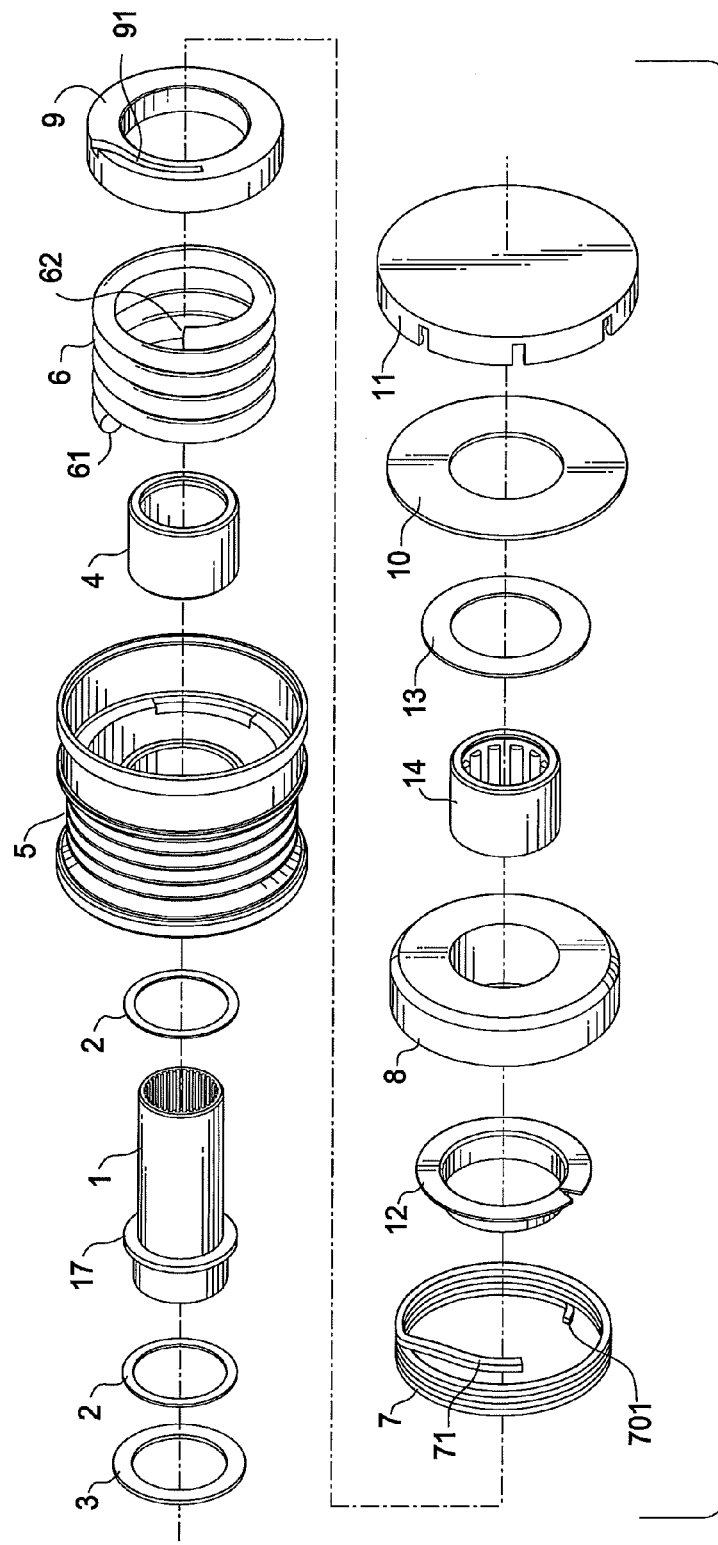
FIG. 2 is an exploded view of the device in FIG. 1.

FIG. 2 is an exploded view of the device in FIG. 1. Wrap Spring 7 can be decoupled or slipped relative to clutch carrier 8 to prevent overstressing torsion spring 6, thereby avoiding overloading one-way clutch 14. In operation, wrap spring 7 begins to decouple from the inner surface 81 of the clutch carrier 8 after pulley 5 has been anugluarly displaced from the load (or drive) position to a predetermined angle. This predetermined angle is selected so that the torque in torsion spring 6 never exceeds a point where torsion spring 6 or one-way clutch 14 can be damaged. The predetermeind angle for the device in this embodiment is 58 degrees, however, this number is not limiting and can be adjusted depending upon the particular application.

In the inventive device wrap spring 7 does not contact the pulley nor the shaft. Wrap spring 7 is contained within a widht (W) of the one-way clutch carrier 8.

Figure 3:
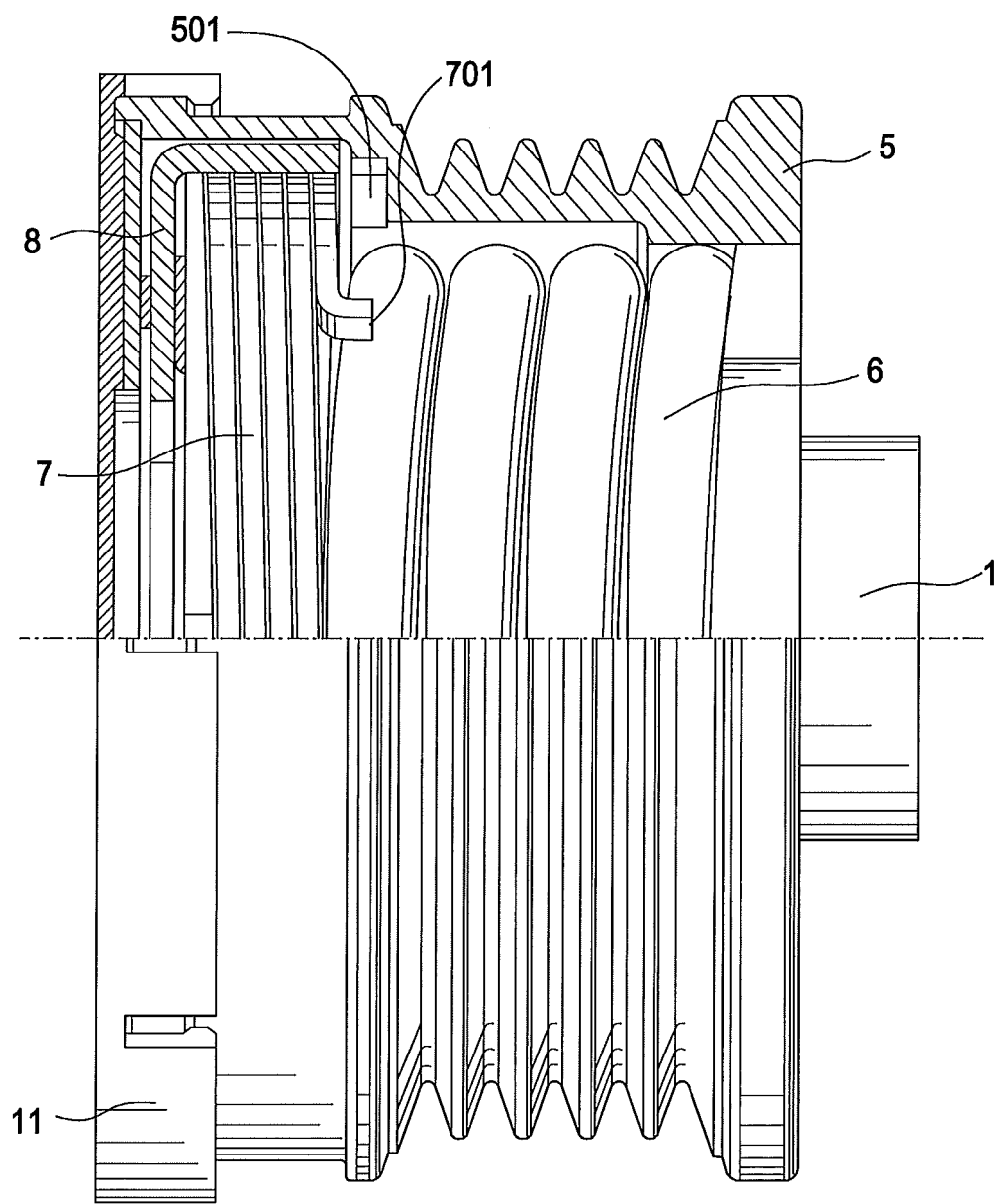
FIG. 3 is a cross section detail of FIG. 1.

FIG. 3 is a cross section detail of FIG. 1. To cause wrap spring 7 to decouple or slip, stop 501 on pulley 5 contacts tang 701 on wrap spring 7, thereby causing wrap spring 7 to wind up and thereby contract radailly inward away from clutch carrier 8 inner surface 81. The radially inward movement of wrap spring 7 away from clutch carrier 8 reduces the amount of torque that can be transmitted through the frictional engagement of wrap spring 7 to clutch carrier 8 before relative slip occurs between the wrap spring and the clutch carrier.

Clutch carrier 8 transfers the torque from wrap spring 7 to one-way clutch 14. One-way clutch 14 enables shaft 1 to be decoupled from the decoupler when the speed of shaft 1 is greater than the speed of the pulley 5 so that shaft 1 overruns pulley 5.

Bushing 12 is disposed inside clutch carrier 8 and allows relative motion between spring carrier 9 and clutch carrier 8. Thrust washer 13 permits relative motion between clutch carrier 8 and front cover 10, which is rigidly fixed to pulley 5. Cap 11 protects the device from the enviroment by preventing debris from entering. There are two thrust washers (2) to axially postion pulley 5 relative to shaft 1 while permiting relative rotational motion between the two components. Rear cover 3 is fixed to pulley 5 and enables both thrust washers to be contained between pulley 5 and shaft 1.

Figure 4:
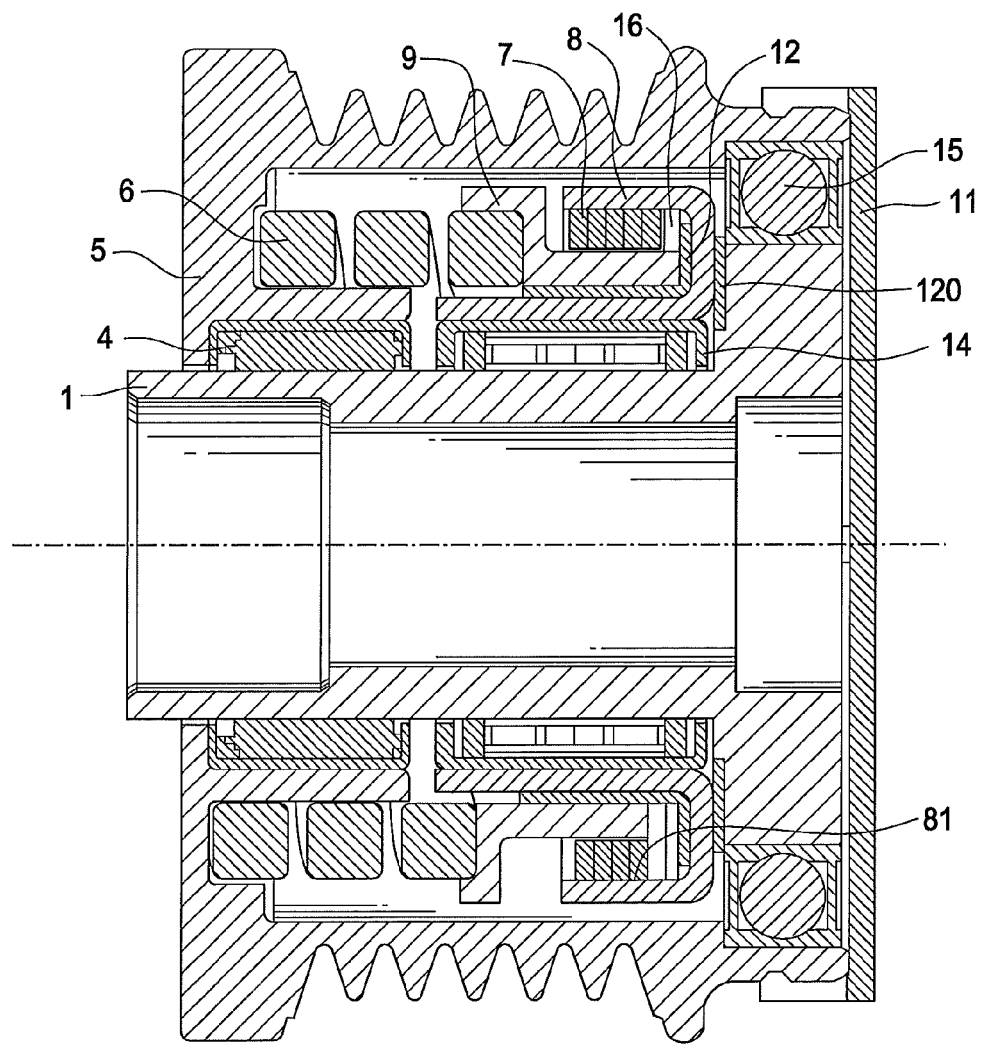
FIG. 4 is a cross section of an alternate embodiment of the inventive device.

FIG. 4 is a cross section of an alternate embodiment of the inventive device. In this alternate embodiment, pulley 5 is journalled to shaft 1 by a ball bearing 15 in addition to the needle bearing 4.

Figure 5:
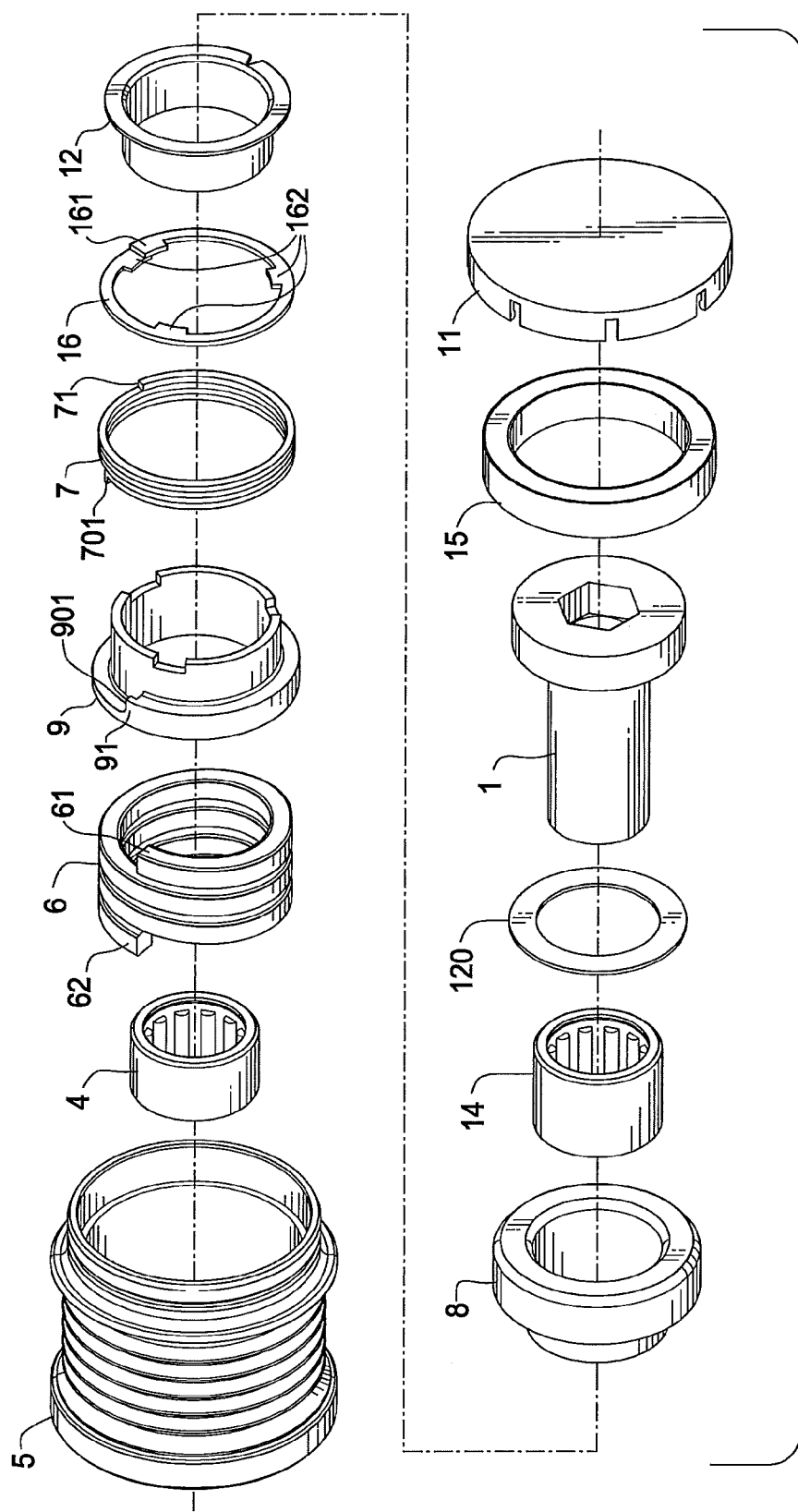
FIG. 5 is an exploded view of the device in FIG. 4.
Figure 6:
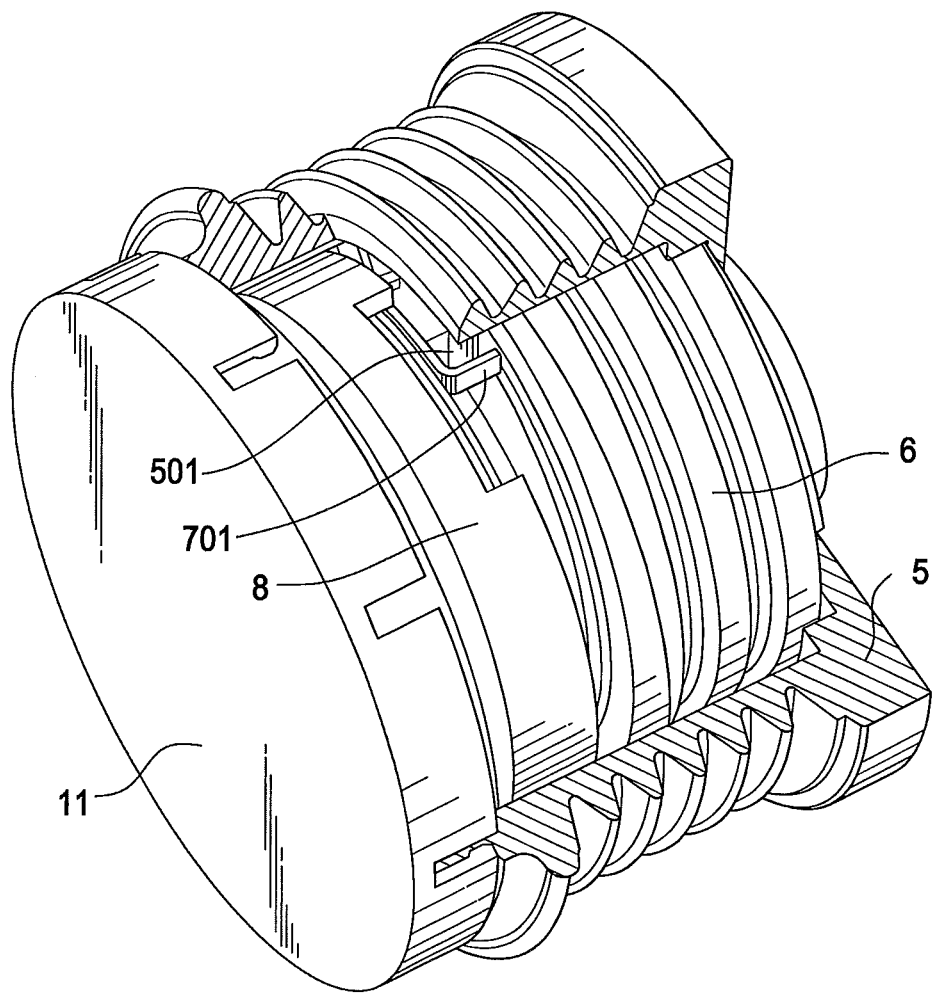
FIG. 6 is a cross section perspective detail of FIG. 4.

FIG. 5 is an exploded view of the device in FIG. 4. FIG. 6 is a cross section perspective detail of FIG. 4.

In this embodiment, torsion spring end 62 is engaged with pulley 5 and end 61 is engaged with spring carrier 9. End 61 engages the spring carrier at portion 91. Wrap spring 7 is engaged between spring carrier 9 and clutch carrier 8. Retaining ring. 16 enables spring carrier 9 to transmit torque to wrap spring 7. Torque from spring carrier 9 is transmitted to retaining ring 16 through three keys 162 on retaining ring 16. The torque from retaining ring 16 is then transferred to the protruding portion 161 of retaining ring 16 engages an end 71 of wrap spring 7, whereby wrap spring 7 is loaded in operation (see FIG. 7).

A bushing 12 allows spring carrier 9 to slidingly engage clutch carrier 8. Bushing 12 allows clutch carrier 8 to slidingly engage shaft 1.

In operation, a torque applied to pulley 5 applies a load to torsion spring 6 in the unwinding direction. This torque is transmitted to spring carrier 9 accordingly, which in turn applies a load to wrap spring 7 in the unwinding direction thorugh a contact at end 71. The amount that torsion spring 6 "unwinds" is a function of the applied torque. Differences in an applied torque to torsion spring 6 will cause the pulley 5 to rotate slightly ahead of a given position of shaft 1.

Loading wrap spring 7 in the unwinding direction causes warp spring 7 to radially expand. The radial expansion causes wrap spring 7 to frictionally engaged with inner surface 81 of clutch carrier 8. The fricitonal engagement "locks" wrap spring 7 to clutch carrier inner surafce 81 which allows transmission of torque to the clutch carrier 8 up to a predetermeind torque limit. One-way clutch 14 also engages, thereby turning shaft 1.

To cause wrap spring 7 to decouple or slip, pulley 5 rotationally advances under the influence of an increasing torque, thereby causing stop 501 projecting inward from pulley 5 to contact tang 701 on wrap spring 7 upon input of a predetermined excess torque. During normal operation stop 501 does not contact end 701. Further movement of pulley 5 causes wrap spring 7 to partially wind up, thereby contracting radially inward away from clutch carrier inner surface 81. The radially inward movement of wrap spring 7 away from clutch carrier inner surface 81 reduces the amount of normal force and therby the fricitonal torque that can be transmitted through wrap spring 7 to clutch carrier 8 before relative slip occurs between the wrap spring 7 and the clutch carrier 8. This feature prevents damage to the device during an overtorque operating condition.

Figure 7:
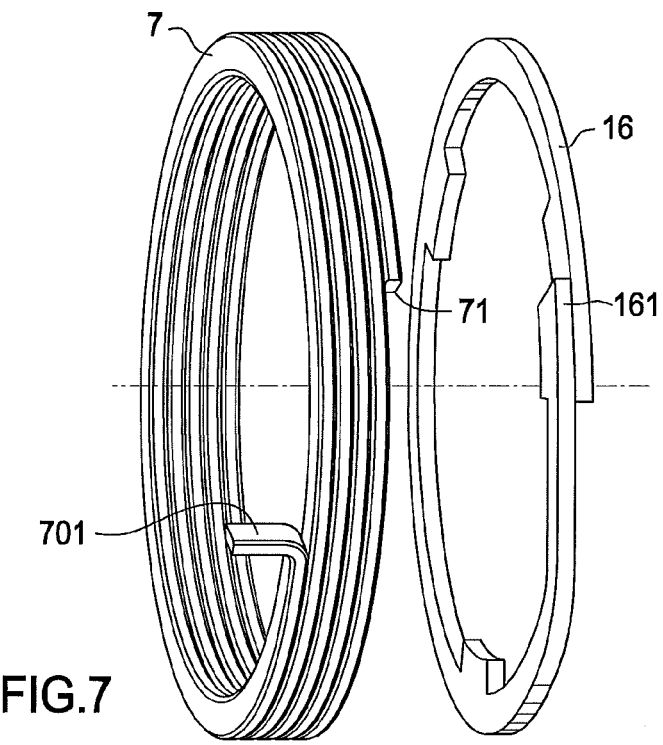
FIG. 7 is a perspective section detail of FIG. 4.
Figure 8:
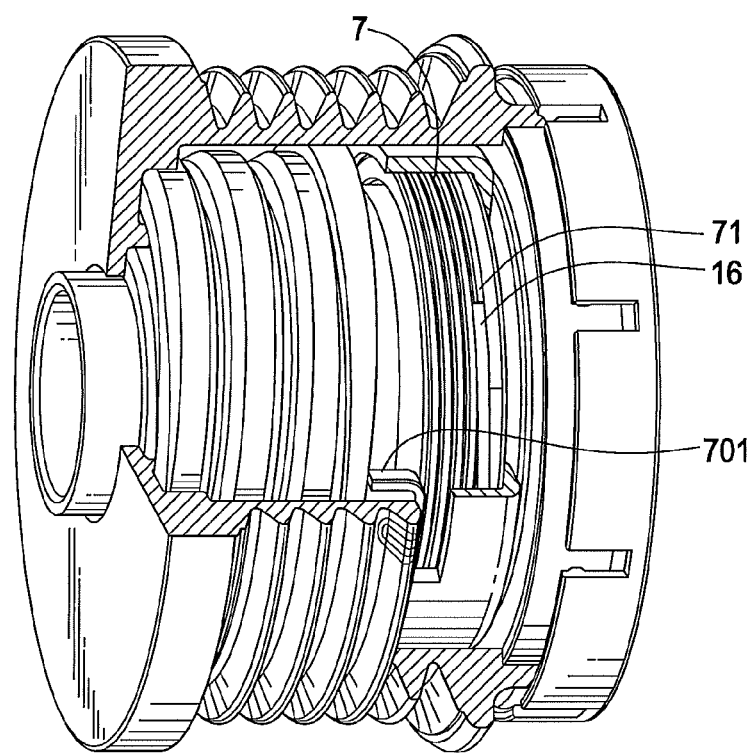
FIG. 8 is a perspective section detail of FIG. 4.

FIG. 7 is a perspective section detail of FIG. 4.
FIG. 8 is a perspective section detail of FIG. 4.

Although a form of the invention has been described herein, it will be obvious to those skilled in the art that variations may be made in the construction and relation of parts without departing from the spirit and scope of the invention described herein.

We claim:
1. An isolator decoupler comprising:
a pulley (5);
the pulley journalled to a shaft (1);
a torsion spring (6) having an end (61) engaged with the pulley, the torsion spring loadable in an unwinding direction;
a one-way clutch carrier (8);
a one-way clutch (14) disposed between the shaft and the one-way clutch carrier;
a wrap spring (7) engagable with an inner surface (81) of the one-way clutch carrier, the wrap spring coupled to the torsion spring; and the wrap spring loadable in the unwinding direction such that the wrap spring through friction is able to lockably engage the inner surface in a driving direction.

2. The isolator decoupler as in claim 1 further comprising a spring carrier (9) engaged between the torsion spring and the wrap spring.

3. The isolator decoupler as in claim 1, wherein the pulley comprises a stop (501), the stop engagable with the wrap spring causing the wrap spring to disengage from the inner surface upon input of a predetermined torque.

4. The isolator decoupler as in claim 1, wherein the pulley is journalled to the shaft on a needle bearing (4).

5. The isolator decoupler as in claim 4, wherein the pulley is further journalled to the shaft on a ball bearing.

6. An isolator decoupler comprising:
a pulley (5);
the pulley journalled to a shaft (1);
a torsion spring (6) having an end (61) engaged with the pulley, the torsion spring loadable in an unwinding direction;
a one-way clutch carrier (8);
a one-way clutch (14) disposed between the shaft and the one-way clutch carrier;
a wrap spring (7) engagable with an inner surface of the one-way clutch carrier, the wrap spring coupled to the torsion spring, the wrap spring further contained within a width (W) of the one-way clutch carrier; and
the wrap spring loadable in the unwinding direction such that the wrap spring through friction is able to lockably engage the inner surface in a driving direction.

7. The isolator decoupler as in claim 6, further comprising a spring carrier engaged between the torsion spring and the wrap spring.

8. The isolator decoupler as in claim 6, wherein the pulley comprises a stop, the stop engagable with the wrap spring causing the wrap spring to disengage from the inner surface upon input of a predetermined torque.

9. The isolator decoupler as in claim 6, wherein the pulley is journalled to the shaft on a needle bearing.

10. The isolator decoupler as in claim 9, wherein the pulley is further journalled to the shaft on a ball bearing.

11. An isolator decoupler comprising:
a pulley (5);
the pulley journalled to a shaft (1) through a needle bearing (4) and a ball bearing (15);
a torsion spring (6) having an end (61) engaged with the pulley, the torsion spring loadable in an unwinding direction in a drive condition;
a one-way clutch carrier (8);
a one-way clutch (14) disposed between the shaft and the one-way clutch carrier;
a wrap spring releasably engagable with an inner surface (81) of the one-way clutch carrier, the wrap spring coupled to the torsion spring, the wrap spring further contained within a width (W) of the one-way clutch carrier; and
the wrap spring loadable in the unwinding direction such that the wrap spring engages the inner surface in a driving direction.

\* \* \* \* \*